(12) United States Patent
Hourie et al.

(10) Patent No.: US 9,076,259 B2
(45) Date of Patent: Jul. 7, 2015

(54) GEOSPATIAL MULTIVIEWER

(75) Inventors: Craig Hourie, Waterloo (CA); Steve Sulte, Markham (CA)

(73) Assignee: Imagine Communications Corp, Frisco, TX (US)

( * ) Notice: Subject to any disclaimer, the term of this patent is extended or adjusted under 35 U.S.C. 154(b) by 640 days.

(21) Appl. No.: 13/232,559

(22) Filed: Sep. 14, 2011

(65) Prior Publication Data
US 2013/0063489 A1    Mar. 14, 2013

(51) Int. Cl.
| | |
|---|---|
| G06F 17/30 | (2006.01) |
| G01C 21/00 | (2006.01) |
| H04W 4/02 | (2009.01) |
| G06T 17/05 | (2011.01) |
| H04W 4/18 | (2009.01) |

(52) U.S. Cl.
CPC .......... *G06T 17/05* (2013.01); *G06F 17/30241* (2013.01); *G06F 17/30817* (2013.01); *H04W 4/025* (2013.01); *H04W 4/185* (2013.01)

(58) Field of Classification Search
CPC .......... H04N 21/23412; H04N 9/8205; H04N 21/4622; H04N 21/23614; H04N 21/4782; H04N 21/472; H04N 21/4524; H04N 21/4728; H04N 21/6175; G06Q 30/277; G06Q 30/0256; G06F 17/30017; G06F 17/30781; G06F 17/30864; G06F 17/30058; G06F 17/3087; G06F 17/30873; G06F 17/30241; G06F 17/30256; G06F 17/3084; G06T 2207/10016; G06T 17/05; G09B 29/10; G01C 21/00; G01C 21/26
USPC .......................................................... 345/473
See application file for complete search history.

(56) References Cited

U.S. PATENT DOCUMENTS

| | | |
|---|---|---|
| 5,112,121 A | 5/1992 | Chang et al. |
| 6,188,442 B1 | 2/2001 | Narayanaswami |

(Continued)

FOREIGN PATENT DOCUMENTS

| | | |
|---|---|---|
| WO | WO 2004/015634 A1 | 2/2004 |
| WO | WO 2009/126687 A1 | 10/2009 |

(Continued)

OTHER PUBLICATIONS

Zhang et al., Presentation of Geo-Referenced Videos with Google Earth, SMVC '10 Proceedings of the 2010 ACM workshop on Surreal media and virtual cloning, pp. 21-26.*

(Continued)

*Primary Examiner* — Kee M Tung
*Assistant Examiner* — Haixia Du
(74) *Attorney, Agent, or Firm* — Tarolli, Sundheim, Covell & Tummino LLP

(57) ABSTRACT

A geospatial multiviewer can include a geospatial application that provides geospatial data responsive to a user input, the geospatial data corresponding to a representation of at least one geographical region. A request engine is configured to provide a search query for requesting content from at least one data source. The search query is based at least in part on the geospatial data from the geospatial application. A graphics pipeline is configured to dynamically generate at least one transformation for adjusting objects in an output presentation in response to the user input. The output presentation is rendered based on the at least one transformation. The objects in the output presentation comprise received content and the representation of at least one geographical region.

24 Claims, 6 Drawing Sheets

(56) References Cited

U.S. PATENT DOCUMENTS

| | | | |
|---|---|---|---|
| 6,597,818 | B2 | 7/2003 | Kumar et al. |
| 6,700,701 | B1 | 3/2004 | Son et al. |
| 7,475,060 | B2 | 1/2009 | Toyama et al. |
| 7,743,064 | B2 | 6/2010 | Faulkner et al. |
| 7,746,343 | B1 * | 6/2010 | Charaniya et al. ............ 345/428 |
| 2002/0055924 | A1 | 5/2002 | Liming |
| 2003/0215110 | A1 | 11/2003 | Rhoads et al. |
| 2004/0243533 | A1 * | 12/2004 | Dempster et al. ................ 707/1 |
| 2005/0246373 | A1 | 11/2005 | Faulkner et al. |
| 2005/0257240 | A1 | 11/2005 | Faulkner et al. |
| 2005/0257241 | A1 | 11/2005 | Faulkner et al. |
| 2008/0147325 | A1 | 6/2008 | Maassel et al. |
| 2008/0307311 | A1 * | 12/2008 | Eyal .............................. 715/733 |
| 2009/0060043 | A1 | 3/2009 | Nuyttens |
| 2009/0254683 | A1 | 10/2009 | Camer et al. |
| 2009/0256835 | A1 | 10/2009 | Moote et al. |
| 2009/0256859 | A1 | 10/2009 | Komorowski et al. |
| 2009/0256862 | A1 | 10/2009 | Rassel et al. |
| 2009/0256863 | A1 | 10/2009 | Komorowski et al. |
| 2009/0256965 | A1 | 10/2009 | Moote et al. |
| 2009/0259775 | A1 | 10/2009 | Faragher |
| 2011/0007134 | A1 * | 1/2011 | Knize et al. ..................... 348/43 |
| 2011/0090399 | A1 | 4/2011 | Whitaker et al. |
| 2011/0145256 | A1 * | 6/2011 | Dunkel et al. ................ 707/743 |
| 2012/0096361 | A1 * | 4/2012 | Osten ........................... 715/731 |

FOREIGN PATENT DOCUMENTS

| | | |
|---|---|---|
| WO | WO 2009/126690 A1 | 10/2009 |
| WO | WO 2011/044017 A1 | 4/2011 |

OTHER PUBLICATIONS

Brochure, "GeoSTAR", Harris Corporation, Feb. 2010, 2 pages.
Brochure, "GeoDART", Harris Corporation, Feb. 2010, 2 pages.
Int'l Preliminary Report, Mar. 18, 2014, HBC Solutions, Inc.
Eugster, et al., "UAV-Based Augmented Monitoring—Real-Time Georeferencing and Integration of Video Imagery With Virtual Globes", International Archives of Photogrammetry, Remote Sensing and Spatial Information Sciences. Beijing 2008, International Society for Photogrammetry and Remote Sensing, GB, vol. XXXVII, Jul. 3, 2008, pp. 1229-1236.
Renner, et al., "Persistent Surveillance", Geoinformatics, IEEE, Aug. 12, 2009, pp. 1-5.
Kim, et al., "Design and Implementation of Geo-Tagged Video Search Framework", Journal of Visual Communication and Image Representation, Academic Press, Inc. US, vol. 21, No. 8, Nov. 1, 2010, pp. 773-786.
Kyong-Ho Kim, et al., "Managing Scheme for 3-Dimensional Geo-Features Using XML", Geoscience and Remote sensing Symposium, 2000 Proceedings, IEEE, Jul. 24-28, 2000, pp. 2899-2901.

* cited by examiner

GEOSPATIAL MULTIVIEWER

TECHNICAL FIELD

The present invention relates generally to a system and method for displaying geospatially relevant information.

BACKGROUND

Various geographic information programs and systems have been developed for presenting users with geographic and geospatial information. Such maps and related services can provide users with options to view street maps, satellite based maps, other spatial metadata (such as directions and traffic details) relating to a geographic region of interest (ROI). Additional static information can also be presented to a user at a fixed location on or adjacent to map. However, the type and manner in which information can be presented in relation to the map is seemingly limited in view of the amount of information and data that may exist.

SUMMARY

The invention relates generally to a system and method for displaying geospatially relevant data. The data, for example, can be utilized as actionable intelligence that is easily navigated and useful to the user.

In one embodiment, a geospatial multiviewer can include a geospatial application that provides geospatial data responsive to a user input, the geospatial data corresponding to a representation of at least one geographical region. A request engine is configured to provide a search query for requesting content from at least one data source. The search query is based, at least in part, on the geospatial data including the region of interest defined by the visible region in the geospatial application. A graphics pipeline is configured to dynamically generate at least one transformation for adjusting objects in an output presentation in response to the user input. The output presentation is rendered based on the at least one transformation. The objects in the output presentation comprise received content and the representation of at least one geographical region.

In another embodiment, a geospatial multiviewer can include a geospatial application, request engine, asynchronous transfer engine, graphics pipeline, and an animation engine. The geospatial application provides geospatial data in response to user input, with the geospatial data corresponding to a representation of at least one geographical region. The request engine is configured to send a search query requesting content from at least one data source, the search query being based, at least in part, on the geospatial data. In one example, the geospatial data can include the region of interest defined by the visible region in the geospatial application. The asynchronous transfer engine is configured to transfer the representation of the geographical region (or regions), along with other data returned from the search query, to graphics memory. As an example, the asynchronous transfer engine can transfer its data at rates that are unrelated to the rate that it is used or consumed by the graphics pipeline. The graphics pipeline then uses the provided data to render a given frame of output. For example, the frames being rendered in this way can turn the various data streams into actionable intelligence at the user's control.

Yet another embodiment provides a computer-implemented method for providing geospatial information. The method can include receiving at least one user input and providing geospatial data in response to the user input. The geospatial data corresponds to a representation of at least one geographical region that is generated by a geospatial application running on one or more computer processors. A search request for content is sent, the search request including a search query based at least in part on the geospatial data. At least one transformation is generated in response to the user input for controlling a relationship among objects rendered in an output presentation. Content is received from an identified resource location. A frame of the output presentation is provided based on at least one transformation, the received content and the representation of at least one geographical region, such that an object corresponding to the received content in each frame of the output presentation has a geospatially relevant context.

DETAILED DESCRIPTION

The invention relates generally to a system and method for displaying geospatial and related data. Embodiments of a geospatial multiviewer shown and described herein provide a geospatial multiviewer that can unify content (e.g., static or real-time, from live and/or historic data sources), geospatial metadata, sensor metadata, distribution protocols, and asset visualization into a single geospatial environment. As a result, users can employ the geospatial multiviewer to gain multi-intelligence awareness from which the user can derive actionable intelligence.

In one embodiment, a geospatial multiviewer can utilize a geospatial map application that provides geospatial data responsive to user inputs. The geospatial data can correspond to a representation (e.g., 2-D or 3-D) of at least one geographical region of interest (ROI). The multiviewer can request content from one or more data source, such as by providing a search query that is derived based, at least in part, on geospatial data (e.g., geospatial coordinates) from the geospatial map application. The content can be stored with geospatial metadata and other information based on which the data source and provide response content based on the search query in the request. The multiviewer employs a graphics pipeline that can dynamically generate at least one transformation for adjusting an output presentation in response to the user inputs for controlling the geospatial map application. The output presentation includes received content and the representation of the geographical region and is rendered based on at least one transformation.

Figure 1:
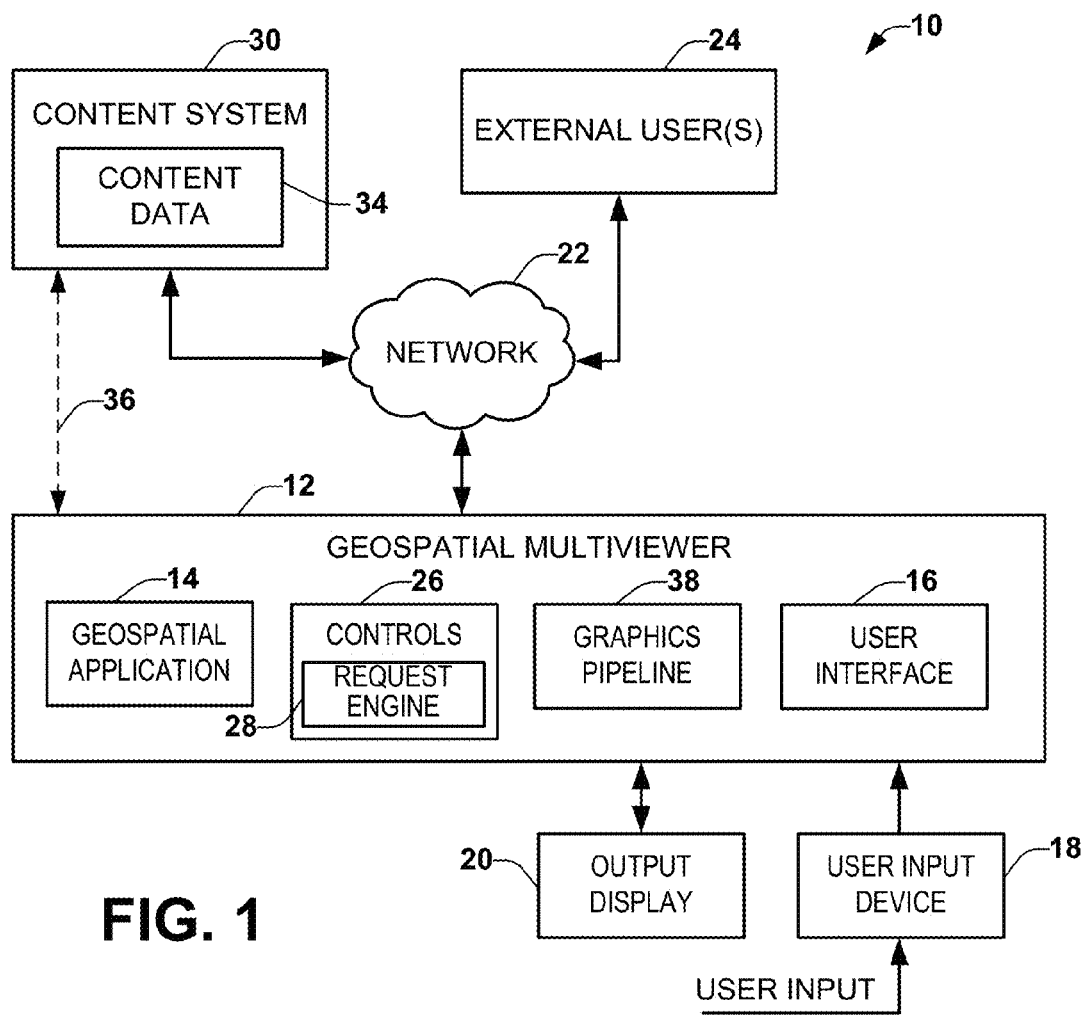
FIG. 1 depicts an example of a system architecture for implementing a geospatial multiviewer.

FIG. 1 is an example of a system 10 that can implement a geospatial multiviewer 12. The geospatial multiviewer 12 is configured to generate views of geospatially organized content for a given region of interest. The content can include video, static images, audio as well as other types of metadata (such as for example, coordinates, regions of interest, timelines, and a host of broadcast and/or military level alarms). The region or regions of interest can be controlled via user interaction with a geospatial application 14. The geospatial application 14 provides a user-controlled frame of reference for the user. The resulting frame of reference and region of interest can be controlled via a corresponding user interface 16 based upon user inputs entered by a user input device (e.g., a mouse, touch screen, keyboard or the like) 18.

The geospatial application 14 generates geospatial data for the user-controlled geographical region. The geospatial data can include geospatial coordinates, data corresponding to a graphical representation for the region of interest, as well as other identifiable information (e.g., labels for cities, regions, landmarks, or other objects) that may be displayed in a map or satellite imagery. The graphical representation of the geographical region can correspond to a two-dimensional or three-dimensional geographical map or visualization. The type and content in the graphical representation can vary depending upon the particular geospatial application that is being utilized.

Examples of geospatial applications that can be utilized in the multiviewer 12 can include Google Map, Google Earth, Bing maps (formerly Microsoft Virtual Earth) to name a few commercially available mapping applications. Alternatively, the geospatial application can be a proprietary geospatial application that can be provided with suitable geospatial data corresponding to one or more geographical regions. The geospatial application can be provided with the geospatial data in a variety of forms, including Keyhole Markup Language (KML). KML is an XML-based language schema that can be utilized for expressing geographic annotations and visualizations on Internet-based, two-dimensional maps and three-dimensional representations. The KML file specifies a set of features (e.g., place marks, images, polygons, 3D models, textual descriptions, etc.) for rendering in a buffer provided by the geospatial application 38. The geospatial application can also provide data for use by the rendering pipeline, most importantly the visible region, focal point, camera position, and other data related to the current frame of reference.

A user can interact with the geospatial application 14 to, for example, change the frame of reference or select one or more points on the map via the user interface 16. For instance, a region of interest can be added, or selected and changed in response to a user inputting instructions via the user interface 16, for example by move a pointing element. Additionally, the frame of reference can be altered by adjusting the camera position on the keyboard or by zooming in or out with the mouse wheel. The geospatial multiviewer 12 is configured to provide the corresponding output to present the representation of the geographical region of interest along with other content in a unified output presentation that can be visualized on an associated output display 20. For instance, the multiviewer 12 can be configured to selectively overlay content onto the graphical representation according to its geographic relevance within the region of interest.

Additionally or alternatively, the geospatial multiviewer 12 can send the unified output to a remote device such as through a corresponding network 22 for use by one or more external users 24. For instance, the geospatial multiviewer 12 can stream a corresponding unified output as a series of frames corresponding to the unified presentation of the geographical representation and related content and to a predetermined resource location corresponding to the one or more external users 24. The frames can be streamed from the multiviewer 12 at one or more user-configurable resolution and type of encoding.

In response to user interaction with the geospatial application 14 via the user interface 16 and depending on the context of the geospatial multiviewer 12, the multiviewer generates a search query. The geospatial multiviewer 12 can derive the search query based at least in part on geospatial data from the geospatial application 14. For instance, the geospatial data can include geospatial coordinates from the geospatial application 14 corresponding to a user defined frame of reference. The geospatial coordinates can define a geographical region. The region may be the entire region that is being presented to the user via the output display 20 or it can be a portion or more of the region that is being displayed to the user. Alternatively or additionally, the geospatial data can include coordinates for one or more user-selected points that may reside within the geospatial region being presented via the output display 20. For instance, a user can employ the user interface 16 to select a point or region on a displayed map, which selection can result in the geospatial application 14 generating data that defines each selected location. The coordinates for the user-controlled graphical region thus provides a frame of reference that can be utilized as part of the search query to narrow the search base for content.

The geospatial multiviewer 12 also includes controls 26 that can be utilized to construct the search query based upon the user inputs provided via the user interface 16. The user interface 16 thus can employ user interface elements from the geospatial application (e.g., via a set of APIs for the application) as well as interface elements and functionality implemented by the controls 26.

The controls 26 can include a request engine 28 that is configured to construct the search query that is utilized to request corresponding content from a content system 30. For instance, the request engine 28 can construct a search query that is utilized to query for content based on geospatial data provided by the geospatial application, such as to constrain the content search to content that is relevant to the user-controlled geographical region. For example, the geospatial data can include a description of a region of interest defined by the visible region in the representation provided by the geospatial application. Additionally, the request engine 28 can construct the search query based on user-defined search criteria, including keywords, temporal constraints or context filters. The user can employ the user interface 16 to enter search criteria that is utilized by the request engine 28 to construct the search query. The resulting search query can contain a set of one or more search strings and can employ Boolean logic as well as other descriptors to define the scope of the search. The search query can be provided according to any one or more query languages, which may be well known or proprietary.

The controls 26 can also be utilized to establish a priority for content that are provided as part of the output presentation, which can determine which units of content will be presented on the output display to the user. The priority can further be used to determine the particular manner each unit of content will be displayed. For instance, higher priority content can be displayed on the geographical representation (e.g., a map) as windows having a determinable resolution, while lower priority content can be displayed as maps or as simple icons on the map. The controls 26 further can control the manner of display as a function of the number of results identified as content.

As a further example, the controls 26 can employ programmable rules to control the output presentation. The controls 26 can employ such rules utilized to define the form and content of the request that is sent (e.g., by the request engine 28) for content based on such rules. Additionally, the controls can generate graphic control instructions to control what content is displayed and how such content is displayed in conjunction with the geospatial data from the geospatial application 14. For instance, the controls 26 can employ such rules to dynamically reconfigure the layout, scaling and other parameters utilized for rendering content and graphics that are displayed in response to user inputs. The controls 26 can also use rules to trigger one or more alerts that are presented in the output as well as to control messaging that can be provided to one or more other predefined recipients, such as via the network, which may be provided via wired and/or wireless communication. The alerts can be manually or semi-automatically generated in addition to automatically generated by the controls 26.

As mentioned above, the request engine 28 can be programmed to request content from the content system 30. The content system 30 can include any number of one or more data sources that may contain or otherwise have access to content data 34. For instance, the request engine 28 can send the query to the network 22 through an IP gateway, such as can be implemented in the multiviewer 12. Alternatively, the geospatial multiviewer 12 and content system 30 may communicate directly via a communication link indicated at dashed line 36. The link 36 can be a wireless link or a physical connection (e.g., optical or electrical conductor cable).

The content system 30 receives and processes the request, which contains a corresponding search description. The search query is derived based at least in part on the geospatial data (e.g., geospatial coordinates) from the geospatial application 14. For instance, the geospatial data can identify a set of coordinates that define a perimeter of the region being displayed. Additionally or alternatively, the geospatial data can include one or more points that have been selected by a user via the user interface 16, such as via the user input device 18 (e.g., mouse, touch screen or the like). As described herein, the user interface 16 can be implemented to access the controls locally at the special purpose computer system implementing the multiviewer. Additionally or alternatively, one or more of the external users 24 can remotely control functionality of the geospatial multiviewer 12 (e.g., via external keyboard, video, mouse (KVM) controls) including the controls 26 and the geospatial application 14.

The content system 30 can conduct a query to identify content data 34 in response to the search query. The content system 30 can send a list of content that matches or is otherwise relevant to the request issued by the request engine 28. The list can include geospatial metadata, content metadata, as well as a resource location identifier (e.g., a network address or uniform resource locator (URL)) and other information for each piece of content in the response. The controls 26 of the geospatial multiviewer 12 can then retrieve content based on location identifier provided for each unit of content identified in the response. Alternatively, in response to the initial request from the request engine, the content system 30 can return content to the geospatial multiviewer as part of its response.

As one example, a streaming engine can be programmed to stream the respective content to the geospatial multiviewer via the network 22. The geospatial multiviewer can receive any number of streams of content from the content system as well as from other available content sources. The multiviewer 12 can control the number of content streams depending upon the amount of content that has been determined to match the search query provided by the request engine 28 and the amount of bandwidth available for receiving content.

By way of further example, a given stream of content can include one or more multiplexed elementary streams associated with the content. Each of the elementary streams for a given type of content (for example audio, video, metadata, etc) can be packetized and transmitted according to a predefined protocol stack, which may be a set of standardized and commercially available protocols or a set of proprietary protocols for streaming the content to the geospatial multiviewer. Examples of possible protocols include TCP/IP, UDP, RTP, RTSP, although other known or proprietary protocols can be used. The particular format of the stream may vary depending upon the type of content carried in the content stream or a given codec for which the data has been encoded. Thus, the multiviewer 12 can employ a gateway that is configured to receive the streams, in one or more of a variety of such formats, and provide the received content to the graphics pipeline 38, for rendering in the corresponding output presentation described herein. Corresponding controls 26 can be operated by the user in a feedback loop to modify the output and generate new queries, which can result in dynamic changes in the output presentation.

A graphics pipeline 38 receives the content streams from the content system 30 and dynamically combines the content with the geospatial data from the geospatial application to present an aggregate output presentation that can be presented to the user via the output display 20. The controls 26 and graphics pipeline 38 cooperate to organize the content and control the presentation of such combined content, such as can be presented as a series of frames at a predetermined rate. For instance, the graphics pipeline can render the output presentation at typical broadcast video frame rates between about 24 and 60 frames per second; however, the only restriction on the frame rate is hardware capabilities. For example, 3-dimensional video content can be rendered at 120 frames per second to appropriate 3-dimensional capable hardware.

The graphics pipeline 38 further is programmed to dynamically generate at least one transformation for adjusting the presentation of the content in response to user inputs that are provided (e.g., via the user interface 16) for controlling the geospatial application 14. For example, the graphics pipeline 38 is configured to dynamically generate at least one Cartesian or other mathematical transformation (depending on the frame of reference) for adjusting objects in the output presentation in response to the user input. This corresponds to the so-called animation engine. Alternatively or additionally, the graphics pipeline 38 can generate one or more transformation dynamically from the frame of reference transformations derived from the geospatial application 14, data provided in the content streams, preconfigured animation routines, or a variety of other sources. As mentioned above, the user inputs can be provided by a user locally via the user input device 18 or remotely. The graphics pipeline 38 renders the output presentation according to compositing parameters that manages and controls which content elements or objects are to be presented on the geographical representation as well as the relationship between the objects including their relative location, size, scaling, orientation and the like.

As a further example, as a user interacts with the geospatial application 14 and/or the controls 26 via the user interface 16, the interactions can result in corresponding changes to the geospatial data. The request engine 28 thus dynamically constructs search queries based upon the real time interactions by the user, which results in the content system 30 identifying corresponding content for the geospatial multiviewer 12 based on constraints defined by the search query. The identified content sources can include the content data 34 stored at a known network location as well as live content being acquired by one or more resources (e.g., video camera, audio, sensors or the like). The geospatial multiviewer 12 can receive the identified content as respective streams via the network 22 or other communications link 36. The graphics pipeline 38 can in turn render the output presentation as a series of successive frames of output data having a predetermined frame rate, such as a video frame rate, which can include dynamically generated graphics, content and geospatial data arranged and organized by the graphics pipeline.

It will be appreciated that each of streams of content received by the geospatial multiviewer 12 and the geographical representation provided by the geospatial application 14 can be provided at different rates from the output rate. Thus, to mitigate pipeline stalls due to the difference in rates, the graphics pipeline 38 can be configured to generate graphics, compose each frame and provide instructions for rendering at a desired output rate while the geographical data corresponding to the geographical region and the streams of content are asynchronously transferred directly to graphics memory. The graphics pipeline 38 can access the content and geospatial graphics memory for rendering each frame at the desired output rate.

As a further example, the geospatial multiviewer can include an asynchronous transfer engine that is configured to implement direct memory access (DMA) APIs for transferring a selected subset of data to the memory of a graphics processor unit (GPU). The GPU in turn can render the resulting output presentation as a frame based upon the compositing parameters and other information along with the data (e.g., content and geospatial information) stored in its memory via the DMA process. The other information can include graphics and a portion of the content, such as metadata and audio and control information. That is, the compositing parameters with other output content (graphics, audio, etc.) is processed through a first synchronous path that includes the graphics pipeline while another selected portions of the content (e.g., streaming video) and the graphical representation of the region of interest are processed along a second asynchronous path that employs DMA. As mentioned, herein the compositing parameters can be derived based at least in part on the transformation that is dynamically generated in response to the user interaction with the geospatial application 14.

The geospatial multiviewer 12 can also present the user with other types of information including audio and metadata that may have been inserted into the content that is received by the multiviewer 12. Thus the controls 26 can implement various decoders that can extract metadata and other types of information (e.g., audio) from the content that is streamed to the geospatial multiviewer. Thus, graphics pipeline 38 can employ the rendering instructions to overlay video and other content on top of the geospatial region of interest (from the geospatial application) at its corresponding geospatial location (real-time or archived) and arranged in an orientation and size that are controlled based on user inputs, transformations derived from the geospatial application, data provided in the content streams, preconfigured animation routines, or a variety of other sources. Such information can also be presented in the output presentation, along with its associated metadata and interactive controls, to provide situational awareness to the user in an intuitive and simple way.

As mentioned above, the geospatial multiviewer 12 can also be configured to provide another version of the output presentation that can be received by one or more external users 24. For instance, the geospatial multiviewer 12 can include one or more output encoders that can encode the output presentation (e.g., containing the geospatial ROI, overlaid content streams, metadata, alarms, dynamic labels, RSS feeds, computer commands, control regions and the like) to a desired format. The multiviewer can transmit the encoded output (e.g., via streaming as frames of video and other content) at a desired rate and resolution for use by one or more of the external users 24. There can be any number of one or more such streams, each of which can be encoded at a desired resolution and output format that can vary for each external user. For instance, the streamed output can be transmitted according to an internet protocol stack which can allow any user to share the output experience. For instance, the external users can view the streamed output presentation as well as implement controls via a personal computer or a mobile device, such as a smart phone that includes internet capability.

Figure 2:
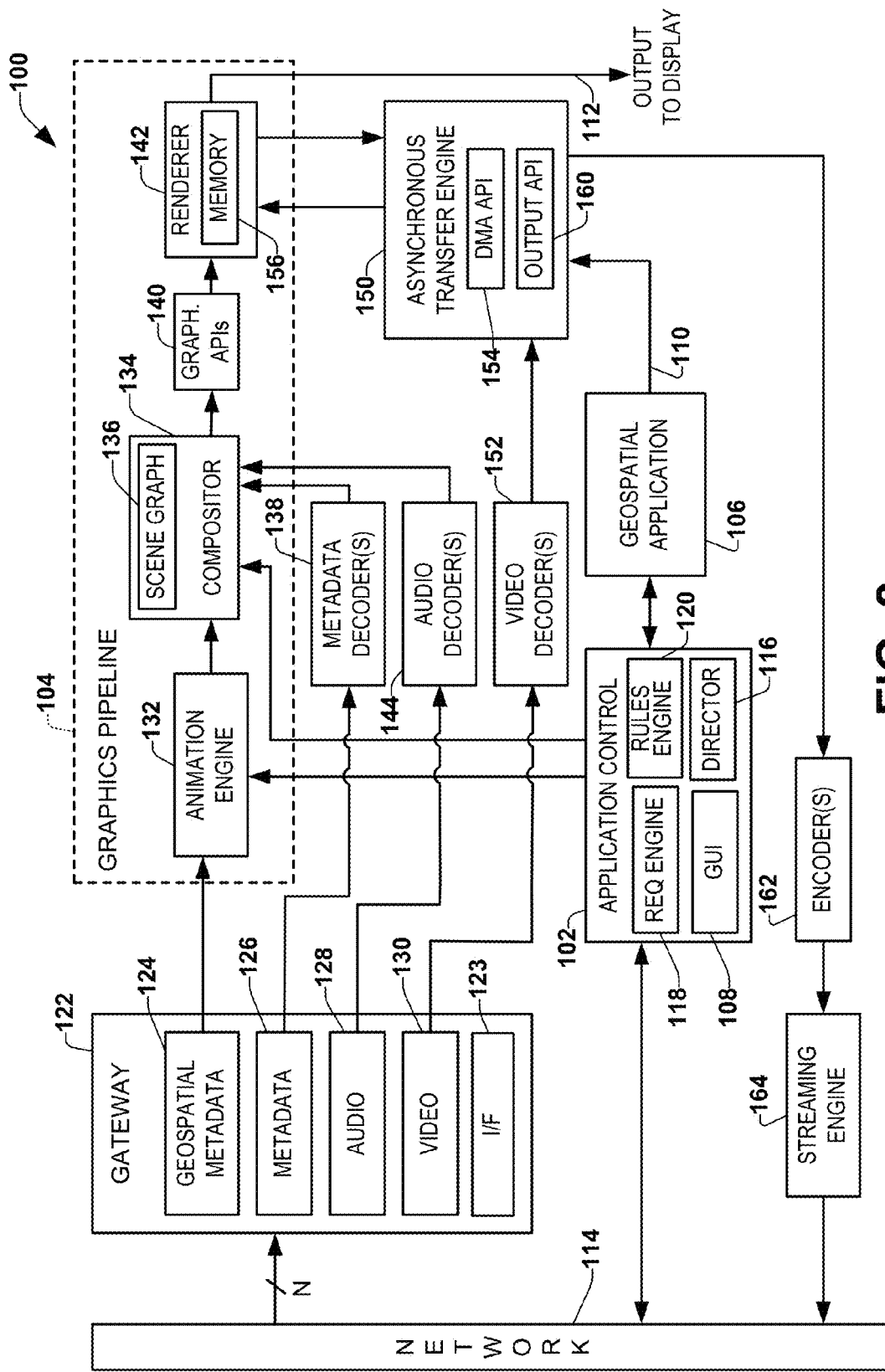
FIG. 2 depicts an example embodiment of a geospatial multiviewer.

FIG. 2 depicts an example of a geospatial multiviewer 100. The geospatial multiviewer 100 includes a combination of hardware and software that are configured to provide an output corresponding to a combined presentation of a geospatial region of interest and other geospatially relevant content that can be selected, arranged and organized based on user controls.

The multiviewer 100 includes an application control 102 that is configured to control aspects of the graphics pipeline 104 as well as provide for interaction and control of the geospatial application 106. For instance, the application control 102 can implement a set of APIs for the geospatial application 106. The application control 102 can include a graphical user interface (GUI) 108 that can present user interface elements that can be manipulated or otherwise interacted with by the user via a user input device. The GUI 108 can also be utilized to set various operating parameters and rules that can control the layout and organization of the output as well as to constrain or filter requests for content.

The application control 102 further can employ the APIs to obtain geospatial data from the geospatial application 106, including geospatial coordinates associated with the geospatial output 110 corresponding to the user controlled geographical ROI that forms part of the output 112. The application control thus can receive content based in part on the geospatial data and the other parameters established by the user via a network 114. It will be appreciated that the network 114 can include a local area network, a wide area network (e.g., the internet) and may involve physical connections as well as wireless links.

The application control 102 can also include a request engine 118 that is configured to generate a search query that is sent to the content system for requesting relevant content. The request engine 118 can employ geospatial data from the geospatial application 106 as well as other user-defined constraints and controls to construct the search query. For example, such other constraints can include temporal parameters (e.g., a relevant time window, such as by specifying a date range and/or time range), keywords, types of media, media sources, or other constraints that can be utilized to narrow a query that is provided by the search query.

The application control 120 can also include a director 116 that is programmed to control the layout of objects and data elements in the output presentation 112. The director 116 can provide appropriate constructions and relationships as well as control the generation of transformations and matrices utilized in composing and rendering the output presentation. The application control 102 provides control instructions to the graphics pipeline 104 that are utilized for the arrangement and organization of data elements or data objects that are going to be rendered in the output presentation 112.

The application control 102 can also include a rules engine 120 that can execute various actions defined by a set of rules.

The rules can be programmed by a user, such as by entering a rule set by the GUI 108. Alternatively or additionally, one or more rules may be programmed according to a set of user-level permissions that can be established in a variety of ways. The rules engine 120 can employ the rules to control an order and/or arrangement of content in the output presentation 112 as well as establish a hierarchy for presentation of content, such as can be determined by the rules engine monitoring predefined metadata or tags that have been inserted into the received content. Additionally or alternatively, the rules engine 120 can execute rules to issue alerts to one or more predefined recipients (e.g., a network end point or user), such as can include visual, audio, remote or localized triggers, e-mail, layout changes, animations, or other forms of communication and messaging.

The multiviewer 100 also includes a gateway 122 that provides an interface between the network 114 and the multiviewer 100. The gateway 122 may contain an interface 123 such as protocol translators, rate converters, fault isolators, or signal translators as necessary to provide system interoperability. The gateway 122 can also perform protocol translation/mapping to communicate with the content system via the network 114 such as by performing the required protocol conversions.

In the example of FIG. 2, the gateway receives N content streams via the network 114, where N is a positive integer denoting the number of streams. The gateway interface 123 can also be configured to extract various forms of content from each one or more content streams received via the network 114. For example, the gateway 114 can demultiplex each of the content streams to provide corresponding elementary data streams, such as can include geospatial metadata 124, content metadata 126, audio data 128, video data 130 or any combination thereof.

The geospatial metadata 124 can correspond to geospatial coordinates that are associated with a given unit of content. The coordinates can be numerical geospatial coordinates, such as defined according to a geographic coordinate system (e.g., Universal Transverse Mercator (UTM) and Universal Polar Stereographic (UPS) coordinate systems, Cartesian coordinate system or any other known or proprietary coordinate system). Alternatively or additionally, the geospatial metadata can include a name that identifies a location, such as a city, region or other identifiable location. The geospatial coordinates can be fixed or they can vary commensurately with the location of the information represented in the content. For example, the content may represent a video of a vehicle moving through a region, such that the geospatial coordinates for the video content (as provided by the geospatial metadata) vary according to the location of the vehicle over time.

The content metadata 126 can include other types of information associated with the received content. For instance, the content metadata 126 can include key length value (KLV) metadata, closed caption metadata, or other forms. As an example, the content metadata 126 can include a priority tag that defines a level of priority associated with a unit of content. The content metadata 126 can include any other information that can be added to or describe a property or characteristic associated with the content into which it has been embedded.

The audio data 128 can include audio content, which may be compressed or provided as an elementary audio stream in any one or more desired formats. There can be any number of one or more streams of audio for each given unit of content, such as different audio streams in different audio formats or in different languages. Similarly, there can be any number of video streams associated with a given piece of video content. For instance, there can be multiple video streams of different angles associated with a given piece of content, such as can be recorded by different viewing angles afforded by different cameras located in a line of sight with a common location.

The geospatial metadata 124 is provided to an animation engine 132 of the graphics pipeline 104. The animation engine 132 can employ the geospatial metadata 124 to identify a corresponding location in the geospatial ROI at which the content (e.g., including metadata 126, audio 128, and video 130) is associated. As mentioned above, control instructions are also provided by the application control 102 to the animation engine 132. The animation engine 132 employs the control instructions to compute parameters for controlling the arrangement, organization and layout as well as the presentation of each given content object and other graphical elements in the output presentation 112. In one embodiment, the animation engine 132 can be programmed to generate a transformation that is utilized for adjusting the output presentation 112 responsive to the control instructions provided by the application control 102. The control instructions further will vary according to user input received via the GUI 108.

For example, the animation engine 132 can dynamically generate transformations based on geospatial data generated in response to user inputs associated with controlling the geospatial application 106. The transformations can include rotation, scaling, translation, shearing, morphing or other image manipulation operations. The transformations can be applied to each of the image objects that are provided in each frame of the output presentation. Thus, the animation engine 132 can update and recalculate transformations in response to each of the user inputs that affect the user controlled frame of reference provided by the geospatial application 106.

The animation engine can provide the generated transformation and other graphic control parameters to a compositor 134. The compositor 134 is programmed to generate compositing parameters based upon the transformation from the animation engine and calls to one or more models that are constructed based on one or more scene graphs 136. The scene graph 136 can be programmed as a data structure that arranges the logical and spatial representation of a graphical scene for each frame of the output presentation 112. The scene graph, for instance, can be implemented as an array or linked list that represents the hierarchy of computations that govern the motion and interrelationships between objects (e.g., corresponding to actors) in the scene corresponding to the output presentation 112. The scene graph 136 thus enables the compositor to group related objects into a compound object which can then be moved, transformed, selected, and rendered as easily as a single object. That is, the transformation calculated by the animation engine 132 can be propagated through the scene graph to facilitate rendering of each frame of the output representation 112.

The compositor 134 also receives control instructions from the application control 102. The metadata 126 can be provided to a metadata decoder 138, which provides decoded metadata to the compositor for use in managing the order of rendering and placement of data objects and content. An audio decoder 144 can receive audio content 128 that is extracted from each of the one or more N input streams. The audio decoder 144 can provide the decoded audio levels to the compositor 136 for compositing (through audio meters) into the visual output and or for output to audible audio.

The compositor 134 operates in real time to manage the location for each of the data objects including their arrangement and relative location in the output presentation 112. The compositor 134 thus manages the order in which objects are rendered and where such objects are to be placed as a function of the parameters and transformations provided by the animation engine 132. In the example of FIG. 2, the compositor 136 receives graphics and output instruction as well as a selected portion of the content, including audio and metadata.

The compositor 134 can be programmed to output rendering instructions and graphics data to a renderer 142 via a set of graphics APIs 140. The rendering instructions include compositing parameters for the content (audio, geospatial metadata, content metadata) received by the compositor 134 as well as compositing parameters for asynchronous forms of content, which are transferred directly to the renderer 142. The graphics APIs 140, for example, can be implemented as a library of APIs, such as can be selected according to the application requirements. As one example, the graphics APIs 140 can be implemented via the DirectX platform which is available from Microsoft Corporation of Redmond, Wash. Other examples of open source graphics APIs 140 include OpenGL (e.g., available from the open GL Working Group under the Khronos Group Consortium), SDL (simple directlink media, and Allegro).

The renderer 142 renders the output presentation 112 based on the rendering instructions and content provided by the compositor 134 as well as content provided by an asynchronous transfer engine 150.

The asynchronous transfer engine 150 receives a selected set of content that is to form part of the output 112, such as including the geographical representation 110 from the geospatial application 106 as well as one or more streams of decoded video content. For instance, video data 130 extracted from the received streams can be provided to one or more video decoders 152 that provide the decoded video streams to the asynchronous transfer engine 150. Each decoder 152 can be programmed to decode a given video stream 130 according to a codec. The decoded video content can be provided to the asynchronous transfer engine 150 at a bit rate and frame rate, which can be different from other content.

The asynchronous transfer engine 150 employs a DMA API 154 for providing the geospatial representation and each stream of decoded video from main memory directly to memory of the renderer 142. For instance, the renderer 142 can be implemented as a GPU having core memory to which the asynchronous transfer engine 150 can directly transfer the decoded video content as well as the geospatial representation. For instance, the application control 102 can instruct the compositor 134 and the asynchronous transfer engine 150 as to the memory location into which each unit of asynchronous content is to be directly transferred. In this way, the renderer can aggregate the rendering instructions, graphics and content from the compositor with the directly transferred content from the asynchronous transfer engine in rendering each frame of the output.

As a further example, the asynchronous transfer engine 150 can directly transfer frames from the decoded video and geospatial representation via a double buffering process to mitigate pipeline stalls, such that the latest frame of video content and geospatial application data are available in the memory 156 of the renderer (e.g., GPU memory) for a final compositing and rendering of the output presentation 112. Double buffering is a form of multi-buffering, which is the method of using multiple buffers in a circular queue of the GPU to overlap processing and data transfer to the buffers.

In addition to the DMA transfer, in which the asynchronous transfer engine 150 provides the video content and geospatial representation data directly to the memory 156, the asynchronous transfer engine can also employ the DMA APIs to read back the output frames from the renderer 142 for providing one or more additional outputs. The asynchronous transfer engine 150 can provide the read back frame data for further processing to be sent out from the multiviewer 100. For example, the asynchronous transfer engine 150 can include an output API 160 that is utilized to send the output to one or more encoders 162. The one or more encoders 162 can be configured to encode the output frames in one or more desired formats which can include a desired resolution and type of encoding for the corresponding audio and video that is provided by the renderer 142 as the output presentation 112. The encoded output can be provided to a streaming engine 164 that in turn can provide one or more output streams corresponding to the same output presentation but provided over the network for use by one or more third parties.

It will thus be appreciated that different portions of the content and controls associated with providing the output presentation 112 can be processed along separate paths. The animation engine 132 and compositor 134 of the graphics pipeline 104 provides a path for controlling the parameters, graphics and selected portions of content and metadata that is provided to the renderer 142 via graphics APIs. The asynchronous transfer engine 150 forms part of another data path for providing other portions of content, including decoded video streams, and the geospatial representation from the geospatial application 106 directly to memory of the renderer 142. This approach mitigates pipeline stalls, such as when decoded video and the geospatial representation 110 can be provided at different rates than the other information. Thus the asynchronous transfer engine can be utilized to ensure that the streams of video and the geospatial representation are available in the memory 156 for rendering at a desired output frame rate (e.g., 60 frames per second).

Figure 3:
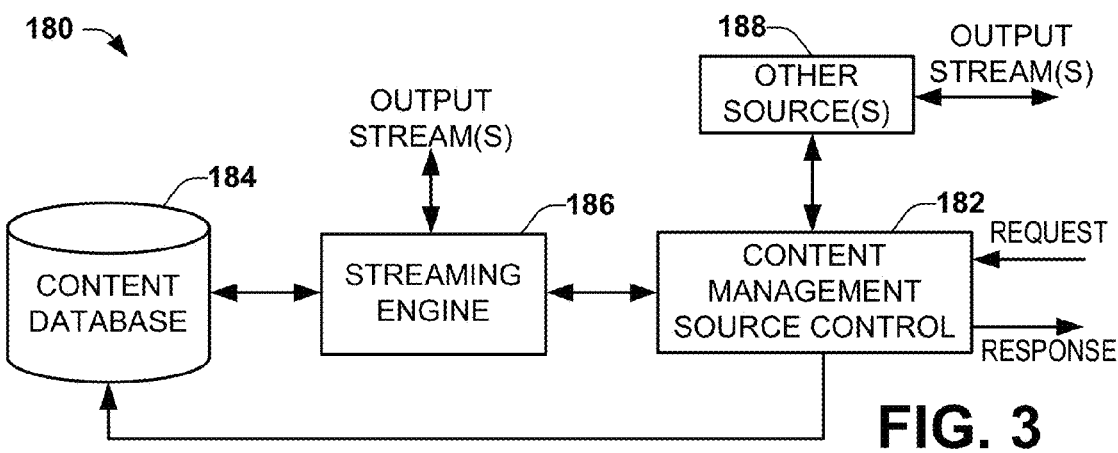
FIG. 3 depicts an example of a content system that can be utilized in conjunction with a geospatial multiviewer.

FIG. 3 depicts a schematic example of a content system 180 that can be utilized in conjunction with a geospatial multiviewer. The content system 180 includes a content management source control 182 that receives a request from the multiviewer. The request can include a search query that defines (e.g., constrains) the search for geospatially relevant content. The search query in the request can include geospatial data, such as coordinates or other location identifying information that can define a geospatial boundary for a user-controllable geographical region of interest as well as one or more specific geospatial locations that can be selected by a user such as via a GUI. The content management source control 182 can in turn query a content database 184 that can employ functions and methods for locating content matching the search query provided in the request. The database 184 can in turn provide the results of the query in the form of a results set that identifies a location for each unit of content. The results set can also include other information associated with the content identified in the results, such as geospatial information or other metadata. The source control 182 can return the results to the geospatial multiviewer for further action, such as described herein.

By way of example, a geospatial multiviewer can employ a gateway to issue a request for content based on the results provided by the source control 182. The request can be executed by a streaming engine 186 for streaming the requested content, which can correspond to a unicast stream directly to the multiviewer or it can correspond to a multicast stream sent to a predetermined network address available to multiple users concurrently. Alternatively, the streaming engine 186 can be controlled by the content management source control 182 for providing one or more streams of content directly in response to the request for content issued by a given multiviewer. The streams for example can include streaming video, streaming audio, a combination of audio and video or other content information and metadata. The streams can correspond to streams of archived historic content, such as stored in the content database 184, or it can be live content (e.g., obtained from a camera, sensor or other device).

One or more other content sources 188 can also be employed to provide content to the geospatial multiviewer. The content management and source control 182 can identify the one or more other content sources 188 based on the search query in each content request. The other content source(s) 188 can provide content in response to the request for corresponding content from the geospatial multiviewer. This content can be provided directly to the multiviewer, be streamed by the streaming engine 186 or another device. The type of content can help determine how the content will be communicated back to the geospatial multiviewer. It will thus be understood that the response provided by the respective content system 180 can identify and/or include any number of one or more streams of content.

The content in the content database 184 can be stored with metadata to facilitate the searching and querying, including the geospatial metadata that can be added to the video according to the location which the video corresponds. An example of the content management source control 182 and the corresponding content database 184 that can be utilized include the Full-Motion Video Asset Management Engine (FAME) system available from Harris Corporation of Melbourne, Fla.

A further example of how content can be received and stored in the content database 184 is shown and described in co-pending and co-assigned U.S. patent application Ser. No. 10/834,495 which was filed on Apr. 29, 2004 and entitled Media Asset Management System for Managing Video News Segments in Associated Methods, which is incorporated herein by reference. The present application also incorporates by reference co-pending U.S. application Ser. No. 10/834,728 and application Ser. No. 10/834,543, which are also co-assigned to the applicant. Each of the above-incorporated applications discloses an approach that can be utilized for collecting video or other types of sensor data and associating corresponding geospatial data (e.g., as metadata) with each of the videos and/or sensor data, such as can be utilized to provide the content data 184 in the example content system 180 of FIG. 3.

As will be appreciated by those skilled in the art, portions of the invention may be embodied as a method, data processing system, or computer program product. For instance, an embodiment may take the form of an entirely hardware embodiment, an entirely software embodiment, or an embodiment combining software and hardware. Furthermore, an embodiment may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, such as demonstrated in the examples of FIGS. 4 and 5.

It is to be understood and appreciated that the illustrated actions, in other embodiments, may occur in different orders or concurrently with other actions. Moreover, not all features illustrated in FIGS. 4 and 5 may be required to implement an embodiment of a method. It is to be further understood that the following methodology can be implemented in hardware (e.g., one or more processors, such as in a computer or computers), software (e.g., stored in a computer readable medium or as executable instructions running on one or more processors), or as a combination of hardware and software.

Figure 4:
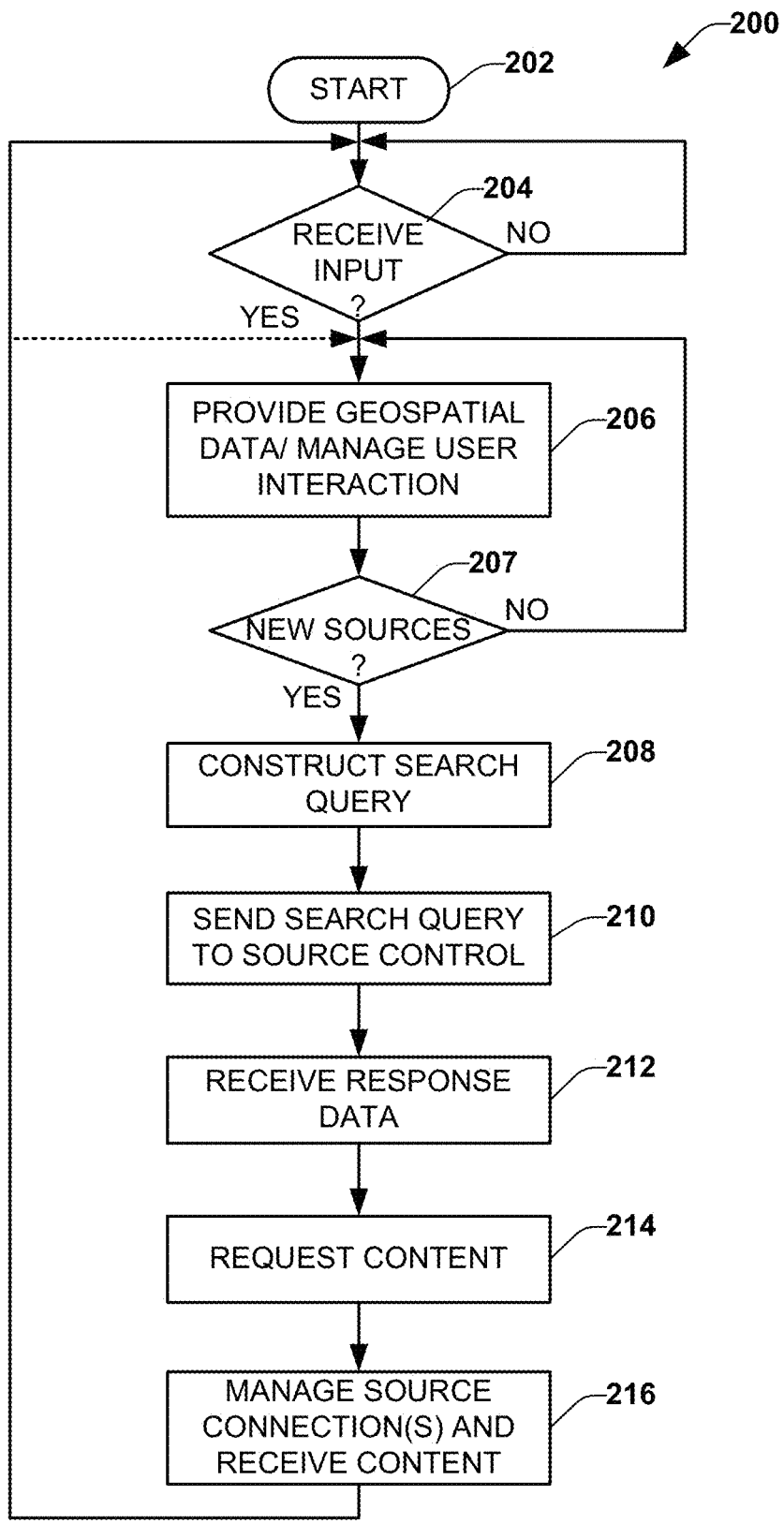
FIG. 4 is a flow diagram depicting a method for providing functions of a geospatial multiviewer.
Figure 5:
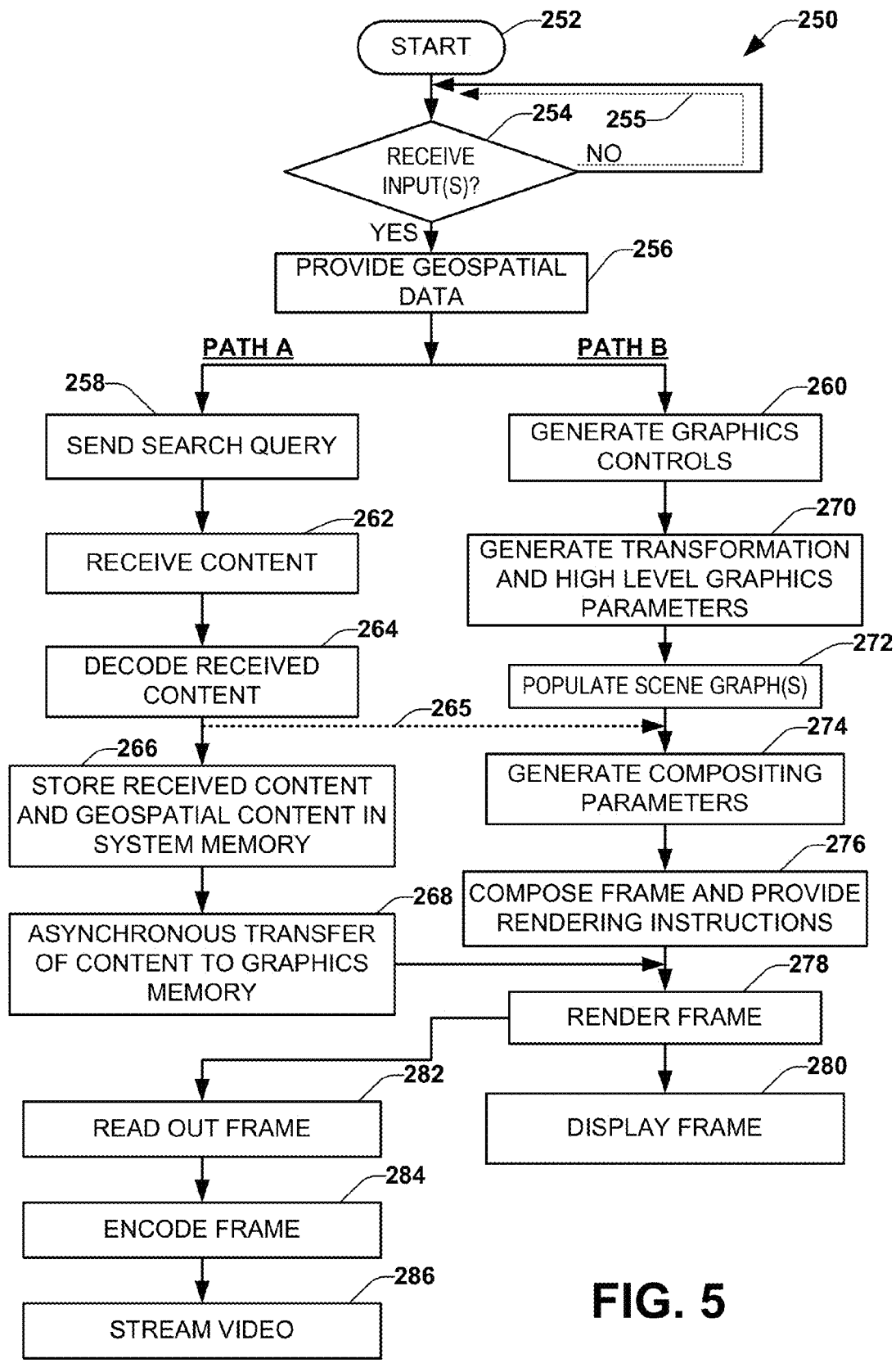
FIG. 5 is a flow diagram depicting a method for providing an output presentation that includes both a geographical representation for a geospatial ROI and content.

Additionally, it will be appreciated that flow diagrams, as FIGS. 4 and 5, which depict a serial flow of actions or functions, may not adequately demonstrate the asynchronous nature of how certain functionality may operate in the context of a geospatial multiviewer. For instance, once configured, the method can respond to changes in the data streams automatically (e.g., through animations, alarms, and other output) without necessarily having direct user interaction. For instance, in response to activating the methods, the geospatial methods will generate requests (e.g., search queries) based on the frame of reference of the geospatial application and default settings. The request will then be sent to the server (e.g., a data source) which serves up the content and the graphics system will render, animate, and monitor the content automatically without any further user interaction. Of course, the user can modify the frame of reference, and make other changes to query constraints, layout of the multiviewer, or other aspects of the systems and methods at any time, which can affect a change in content and how it is displayed. It is within this context and asynchronous nature of operation that FIGS. 4 and 5 are to be considered.

FIG. 4 depicts an example of a method 200 that can be utilized for accessing content that is to be displayed in conjunction with the geospatial representation from the geospatial application. The method 200 begins at 202 such as in conjunction with starting the geospatial multiviewer, including user interfaces, application controls and a geospatial application. As mentioned above, in response to being started at 202, the method can issue one or more requests to retrieve and display content in the multiviewer.

At 204, a determination is made as to whether an input is received. It is appreciated that the input can be provided locally via a user interface, such as input via a user input device (e.g., a keyboard, mouse, touch screen or the like). Additionally or alternatively, a user input can be received through a remote interface, such as through an external control interface. Alternatively, or additionally, the input can be received from another application, can correspond to simply starting and/or configuring the application to operate or be received over one or more streams, such as from a remote source. If no user input is received the method can continue to provide its output, which may continually update or be unchanged and loop at 204 until one or more input is received.

For instance, in the absence of a user input, the output representation for the geospatial representation of the user-controllable ROI can proceed to be displayed and will dynamically change through updates in the content that is overlaid on the geospatial ROI, including streaming video, audio or a combination of audio/video images and/or other data. Additionally, these changes may cause alarms to be triggered, which can lead to substantial changes depending on the types of cascading events that they are configured to set in motion.

If an input is received at 204, the method proceeds to 206. For example, if a video stream priority (delivered as a metadata element in the stream) reaches a critical threshold, it may be moved to a prominent location in the composited output, trigger automatic connections to all data streams that are spatially close to its geospatial location, have its border turn red, sound an audible alarm, and trigger a set of emergency e-mail to be sent to important individuals, all without any direct user interaction (beyond the initial configuration).

At 206 geospatial data is provided. The geospatial data can be provided by the geospatial application (e.g., geospatial application 14 of FIG. 1). The geospatial data can include geospatial coordinates or other location identifying information, such as can be utilized to identify a point, a region on a map or a combination of points and regions for which a corresponding user-selected geographical ROI is being displayed to the user. The geospatial data can also include geospatial metadata, such as defining a region of interest that corresponds to visible portion of the geospatial display being presented to the user.

At 207, a determination is made as to whether one or more new sources of content are required. This determination can be made in response to the input received at 204, based on the geospatial data provided at 206 or both. If no new sources of content are needed, the method can return to 206 and continue to provide the geospatial data. If one or more new sources of content may be needed, the method can proceed to 208.

At 208, a search query is constructed. The search query includes constraints corresponding to a user control criteria that will be utilized by one or more content systems to identify the content that is material to the geospatial applications output. The search query, for example, can include geospatial coordinates corresponding to the user input that is received by the geospatial application and provided as corresponding geospatial data. In addition to geospatial data that is responsive to the user inputs at 204, the search query can also include any number of keywords, which can be entered as a structured query such as including Boolean operators, natural language or a combination of different queries.

At 210, the search query is sent to a source control. The source control can be implemented as part of a content system, such as shown and described herein (e.g., content system 30 of FIG. 1). The source control can be programmed and configured to query a database based on the search query. As one example, the source control can be a front end interface associated with the FAME architecture available from Harris Corporation of Melbourne, Fla. It will be understood and appreciated that the search control can be configured to search any number of databases or other content resources for identifying and/or retrieving content assets that may be relevant to the search query from any number of sources. The sources can include internal sources within a firewall as well as publicly available source content. Additionally, the content can be stored content as well as can include live content, such as real time audio, real time video, sensor data or a combination of real time and stored information content.

At 212, response data is received. The response data can include an identification of relevant content. The response data can be provided in the form of a list of content resources, such either matching or having a degree of likelihood of matching the searched description. For example, the response data can be provided in a variety of forms, such as a document or file containing a list of resource identifiers (e.g., uniform resource locators (URLs)) or other types of resource identifiers that identify accessible locations for each unit of identified content relevant to the search query.

At 214, a request is made to retrieve at least a portion of the content identified in the response data. The request, for example, can be made for initiating a connection with the content location. For instance, the connection and receipt of each unit of content can be managed by a gateway that is configured to connect to the content location for receiving the content via a network. That is, the gateway can connect to identified content resources and, at 216, manage the source connections and receive the content. As described herein, content can be streamed from each resource, such as in the form of audio, video or other content (e.g., sensor data, manual surveillance data or the like) or a combination thereof. The method 200 can return to 204 and repeat selectively retrieving content in response to each user input. Additionally or alternatively, the method 200 can return to 206 to provide geospatial information, which as described herein can be continually updated and generated by a geospatial process.

FIG. 5 depicts an example of a method 250 that can be utilized for providing an output presentation that includes both a geographical representation for a geospatial ROI and content than can be overlaid onto the representation. The method 250 begins at 252, such as in conjunction with an execution of a geospatial multiviewer, which includes application controls initializing variables to starting conditions as well as accessing and invoking a geospatial application, such as shown and described herein. Thus, initially a default geospatial location for corresponding geographic region can be presented to an output display. The initial display can be a user-defined location, a default location according to the user specific requirements or correspond to a last location viewed by a given user.

At 254, a determination is made as to whether any input has been received. The input can be the type of input for which one or more source of data may be required. For instance, the input can be a user input or it can correspond to other data (e.g., metadata) that can be provided by another application or a combination of input sources. For instance, if no input is received for which an addition source or sources may be needed, as indicated schematically by dotted line 255, the method 250 can continue to dynamically update the geographic representation of a corresponding geographic region as well as content associated with the displayed region based on the existing configuration and dynamic content that is provided in the data streams (e.g., metadata). The content can be fixed or change with respect to time which can be based on a variety of user based controls or constraints. If an input is received, the method proceeds to 256 and corresponding geospatial data can be provided (e.g., by a geospatial application). The geospatial data can include the graphical data for rendering the region of interest as well as geospatial coordinates and metadata associated with the region. Geospatial data can also include one or more locations corresponding to a geospatial location or region where a user input had been made. For instance, a user can employ a user input device to select a point or region from the current geographic representation using a GUI.

From 256 the method proceeds to 258 and 260 to implement parallel data flow paths, indicated at PATH A and PATH B, which that can be utilized for processing and generating the resulting output presentation. As described herein, to mitigate pipeline stalls, received content and geospatial content corresponding to the geographical representation of the ROI are processed separately in PATH A and integrated together by a renderer (e.g., the renderer 142 of FIG. 2) together with graphics and rendering instructions generated in PATH B to provide the corresponding output presentation. It further will be understood that there can be any number of such parallel paths to process corresponding graphical content and metadata from any number of one or more content sources. That is, while PATH A and PATH B are depicted as serial in nature following geospatial data being provided at 256, it will be understood that such paths can be implemented repeatedly and dynamically updated based on geospatial data and other data in streams received by the multiviewer process.

Turning to PATH A, at 258, a corresponding search query is generated and sent to a source control, which results in content being received at 262. The search query and receiving of content at 258 and 262 can be implemented as according to the method 200 shown and described with respect to FIG. 4. Those skilled in the art will understand and appreciate other methods that can be used individually or in combination to access and receive suitable content in response to a search query.

After the content is received, at 262, any received content that is encoded can be decoded at 264. For instance, the content is received and separated from the input stream, such as by a demultiplexer or other method of packet extraction. This can result in various types of metadata and content being extracted from the received content streams, such as geospatial metadata, content metadata, audio, video being extracted and stored in memory (e.g., buffers). The extracted metadata and content can be sent to corresponding decoders as appropriate. For example, extracted packets of metadata, audio and video can be buffered and decoded by corresponding decoders. The metadata and audio can be sent to the graphics pipeline for further processing (e.g., represented by a dotted line 265 in which certain content is provided to the graphics pipeline of PATH B for additional processing in the method 250).

At 266, other certain portions of the received content and geospatial ROI (from the geospatial data provided at 256) are stored in system memory. The received content, for example, can correspond to video data for any number of one or more content streams, each of which is corresponds to a respective geospatial location by associated geospatial metadata. The geospatial ROI content corresponds to the geographical representation such as can correspond to a map or satellite image of the corresponding region of interest, which is output by a geospatial application.

At 268, the stored content is asynchronously transferred to graphics memory. For instance, a corresponding frame of video content for each given content stream can be asynchronously transferred directly to predetermined memory area of a GPU. Additionally, the graphical representation for the geospatial application can also be sent to another predetermined location of the GPU memory via DMA to mitigate pipeline stalls. The DMA process for such content can be implemented according to a multiple buffering process between an asynchronous transfer engine and the GPU.

Returning to PATH B, at 260, graphics controls are generated responsive to the geospatial data and user inputs received at 254 and 256. At 270, one or more transformations and high level graphics parameters are generated. The transformation can be generated in response to the user input at 254, such as to maintain and/or modify the relationship and position of graphics objects (e.g., by scaling, rotating, moving and translating graphics parameters). At 272, corresponding scene graphs can be populated for a next output frame. For example, the scene graph can be a node-based arrangement of elements that can be populated for a given scene (e.g., frame) by transversal of nodes of the scene graph for implementing the transformations generated at 270.

At 274 the frame can be composed and rendering instructions generated. For instance, the frame composition can be defined by a set of compositing parameters generated based upon the parameters at 270 and scene graphs at 272 as well as other graphics and decoded content provided via the PATH A at 265. The compositing parameters also define the output locations at which the other content, which has been transferred to graphics memory at 268, is utilized for generating compositing parameters that control how each of the graphics elements and pieces of content are to be arranged and organized in the resulting output presentation.

At 276, a frame is composed and rendering instructions provided, such as based on the compositing parameters and graphical objects generated at 274. The rendering instructions, for instance, can employ a set of graphics APIs for use in controlling the graphics output of a GPU that is configured for rendering the output presentation, which includes graphics and related contents that have been processed through PATH B as well as other content, including geospatial content and received content that were transferred directly into graphics memory via PATH A.

At 278, the corresponding frame is rendered, which is in turn displayed at 280. In addition to rendering the frame for display at a local machine for display to the user in a desired format (e.g., via digital video interface (DVI) or other standard output), the corresponding output frame can also be read out of the graphics memory at 282. The corresponding frame can then be encoded at 284 and streamed out at 286 as video over a network for use by one or more external users. Thus, the streaming output at 286 can be streamed to a resource location (e.g., at a predetermined URL) that can be accessed by one or more users so that multiple users can view the same geospatial multiviewer output presentation. In addition to viewing the corresponding output, one or more users can remotely control the output including the geospatial output and resulting content by entering commands remotely, which can be received as user inputs at 254.

Figure 6:
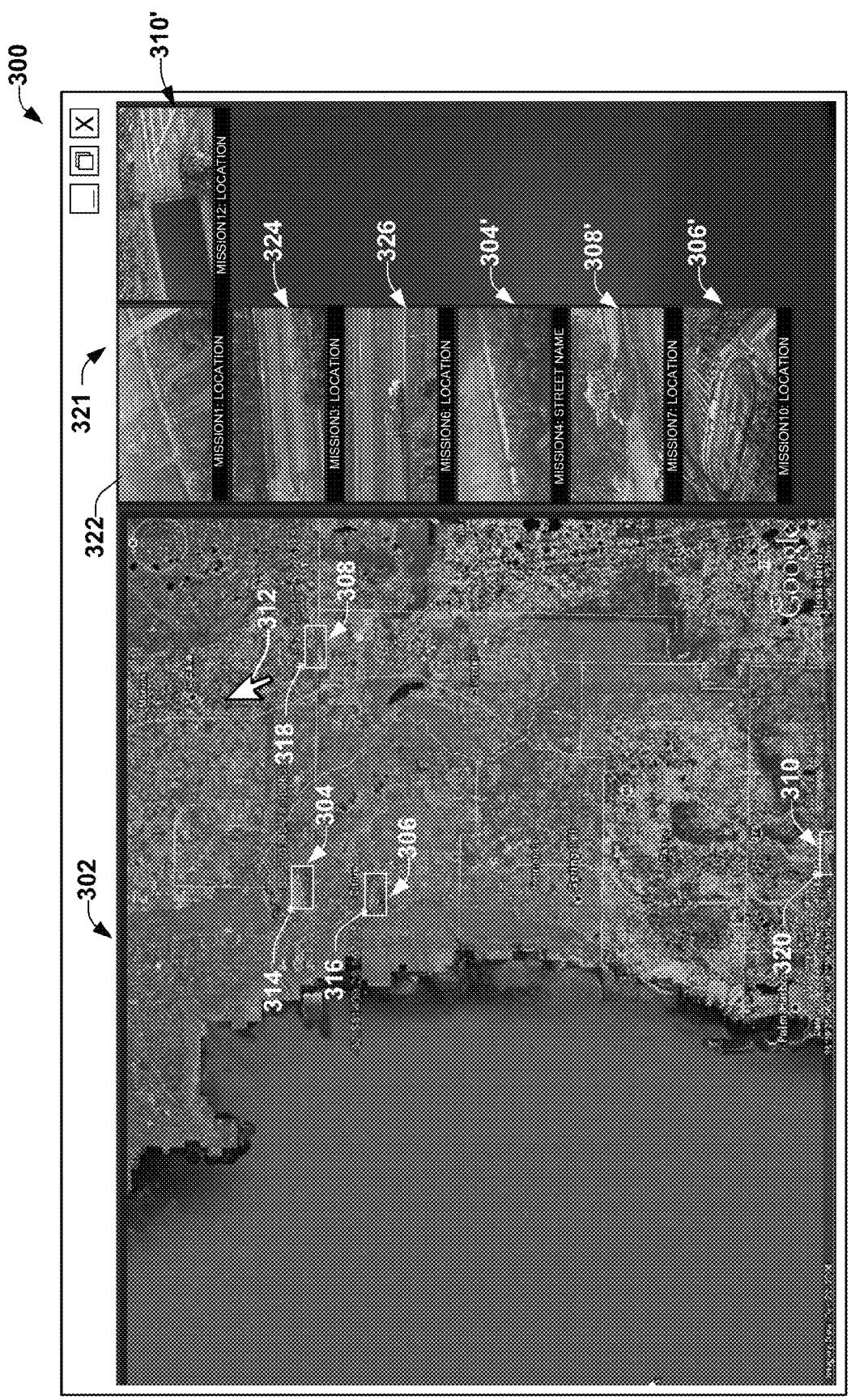
FIG. 6 depicts an example of a screen shot demonstrating an example embodiment of a display generated by a geospatial multiviewer.

FIG. 6 depicts an example of a corresponding output display 300 that can be presented by a geospatial multiviewer. In the output display 300, the output includes a display window, indicated at 302, for a user-controlled ROI. The content provided in the window 302 can include additional geospatially relevant content superimposed on the ROI at predetermined locations. In the example content window 302, a plurality of units of content are overlaid on the geographical representation for the ROI, demonstrated as streaming content windows 304, 306, 308 and 310. Each of the respective content windows 304, 306, 308 and 310 are objects that can be oriented, scaled and sized relative to the size and scaling of the geospatial content in the output window 302, which can vary in response to user inputs.

By way of example, a user can employ a pointer 312 to select a location, such as a point on the geographical region or a portion of the ROI. Additional controls and functions may be accessible to the user via other user interface elements, such as by a right click operation with a mouse or other user input controls. Additionally, controls associated with the geospatial application can be activated in response to user inputs via the pointer 312 or other user interface elements. For instance, a user can provide user inputs to zoom in or out of the geospatial ROI or reposition the map, which user inputs can result in a change in the scaling and positioning of the geospatial ROI as well as the corresponding content that is being overlaid on the geospatial representation (e.g., via generating corresponding transformations as described herein). As mentioned above, each of the content windows 304, 306, 308 and 310 can be objects that are programmatically referenced to a geospatial location (e.g., via geospatial metadata for each content stream that is provided for each respective window). The location can be identified by a graphical object which can be indicated on the display at 314, 316, 318 and 320, respectively along with respective coordinates. As described herein, the content window can be fixed in to a location on the geospatial ROI or the relative position of the content windows can be moveable, such as depending on whether its geospatial metadata is fixed or changes.

In addition to showing the scaled version of the content directly on the geographical representation, an additional display window 321 can also include relevant content for the selected region of interest. Thus in the example of FIG. 6, the window 321 includes a plurality of content objects 322, 324, 326, 304' 308, 306' and 310'. Each of the display objects 322, 324, 326, 304' 308, 306' and 310' can contain streaming content that is received in response to user inputs associated with the geospatial window 302. For instance, as a user selects a given location, such as the location 314, corresponding content is retrieved from a content source resulting in the content window 304 being overlaid on the geospatial ROI at the corresponding location. A corresponding graphical object 304' is also shown and displayed in the content window 321. A description associated with the content window 304 can also be displayed in conjunction with the graphical display of a streaming content 304', which in this example is "Mission4: street name". It will appreciated that various types of information can be inserted onto the display 300, which can thus identify the location to the user as well as any other pertinent information. Further information may be accessible by activating the respective objects 322, 324, 326, 304' 308, 306' and 310'. Such information can be extracted from metadata that is provided with the content being streamed to the geospatial multiviewer. Similarly, the other content windows 306, 308 and 310 presented in the graphical display window 302 may also include corresponding content objects in the content display window 321, indicated respectively at 306', 308', and 310'. Additional relevant content including 322, 324 and 326 can also be presented on the display, such as for nearby areas or other high priority data that may be deemed important based upon predefined rules associated with the geospatial multiviewer.

Figure 7:
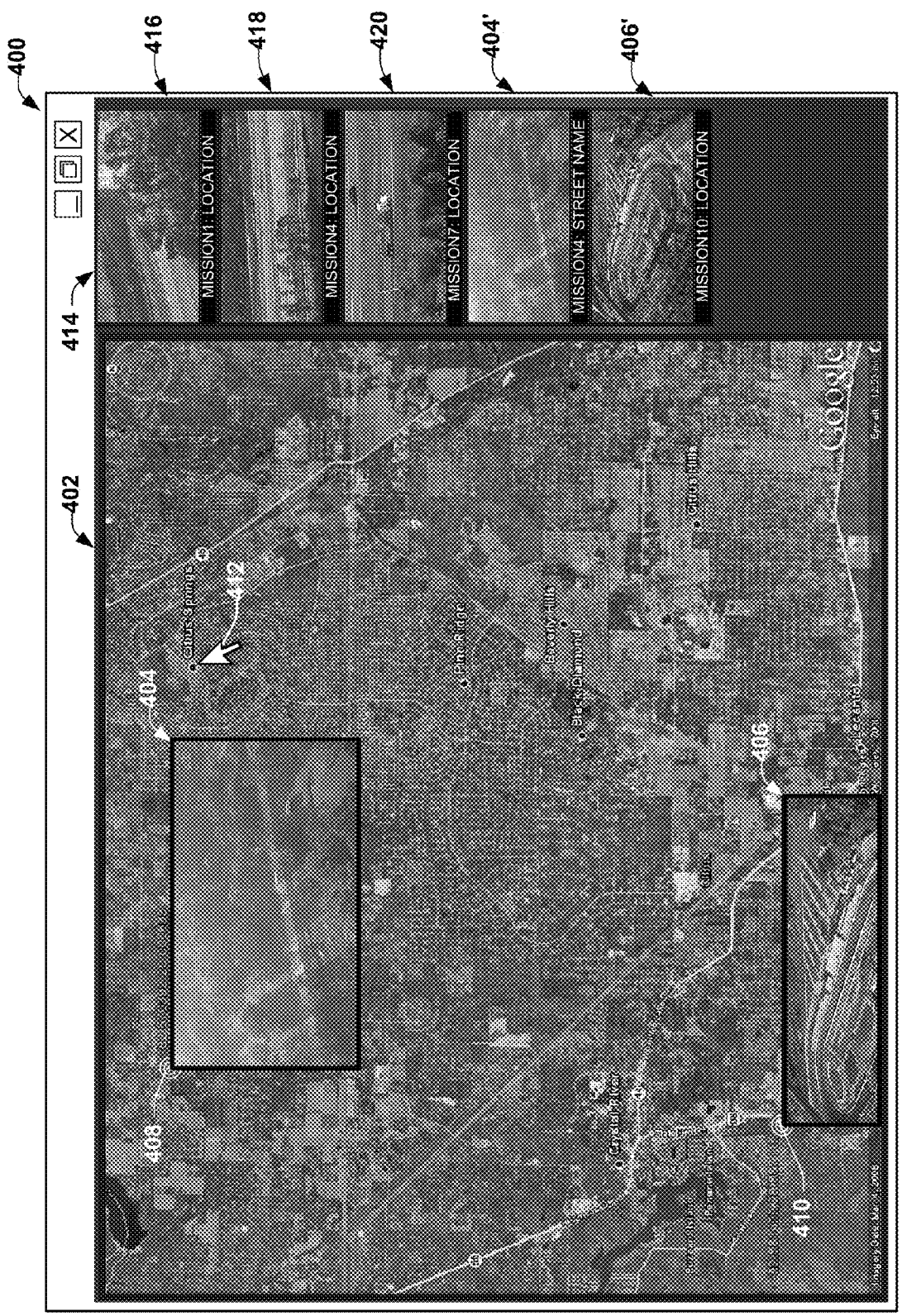
FIG. 7 is an example of a screen shot demonstrating another display that can be generated by a geospatial multiviewer.

FIG. 7 depicts an example of an output presentation 400, such as corresponding to an enlarged view of a portion of the display that is shown in the example of FIG. 6. For example, a user can employ user interface controls to zoom in on the geospatial ROI, such as via a corresponding user input device. The controls associated with zooming in or otherwise affecting the display of the geospatial application can be accessed by the geospatial multiviewer to, in turn, control the graphics pipeline for implementing the corresponding transformations of the output image and other features of the graphics pipeline such as disclosed herein (e.g., see FIG. 2 and FIG. 5).

In the example of FIG. 7, the output presentation 400 includes a geospatial content output window 402 presents a corresponding geospatial ROI along with content windows 404 and 406 superimposed on the location. Each of the content windows 404 and 406 is associated with a corresponding geospatial location indicated at 408 and 410, such as can have been selected by a user via a pointer 412. Content for each location thus can be streamed into each content window 404 and 406 for rendering concurrently with the geospatial content at a desired frame rate.

Adjacent the geospatial display window 402, is a content display window 414. The content display window 414 can include a presentation of content being streamed in response to the geospatial data provided by the geospatial application for the region of interest in the display window 402. In the example of FIG. 7, the content display area 414 includes an area for displaying the same content that is associated with each of the content windows 404 and 406, indicated at 404' and 406'. Additionally, the display area 414 includes additional content indicated at 416, 418 and 420 such as can be associated with high priority content or content otherwise relevant to the search results for the area in the display window 402 or other search criteria that may have been entered by the user.

What has been described above are examples and embodiments of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications and variations that fall within the scope of the appended claims and the application.

What is claimed is:

1. A geospatial multiviewer comprising:
a geospatial application that provides geospatial data in response to a user input, the geospatial data corresponding to a representation of at least one geographical region;
a request engine configured to provide a search query for requesting content from a plurality of data sources, wherein the plurality of data sources comprise a plurality of video sources to provide a plurality of video streams, the search query being based at least in part on the geospatial data from the geospatial application; and
a graphics pipeline configured to dynamically generate at least one transformation for adjusting objects in an output presentation in response to the user input, the output presentation being rendered based on the at least one transformation, the objects in the output presentation comprising a region object representing at least one geographical region and selected video objects corresponding to a subset of the plurality of video streams selected in response to the search query, wherein at least one of the selected video objects comprises a respective video stream of the subset of the plurality of video streams, the graphics pipeline further configured to overlay the selected video objects directly over respective portions of the region object in the output presentation, wherein a respective portion of the region object over which each of the selected video objects is overlaid corresponds to a geographical location represented in content of a respective video stream of the subset of the plurality of video streams.

2. The geospatial multiviewer of claim 1, wherein the graphics pipeline further comprises:
- an animation engine configured to calculate a respective transformation based at least in part on the received content for at least a substantial portion of a plurality of frames for controlling at least a relative orientation and scaling of the objects in the output presentation in response to the user input; and
- a renderer configured to render the output presentation for each of the plurality of frames based on the transformation calculated for each respective frame.

3. The geospatial multiviewer of claim 2, wherein the graphics pipeline further comprises a compositor programmed to provide rendering instructions and selected content to the renderer, the compositor generating the rendering instructions based on the at least one transformation to control position and relationships of the objects rendered in each frame of the output presentation.

4. The geospatial multiviewer of claim 3, wherein the selected content provided by the compositor to the renderer for each frame excludes at least one of the representation of the at least one geographical region and video content, the video content and the representation of the at least one geographical region being provided to the renderer via a different, separate path, wherein the representation of the at least one geographical region comprises a geographical map.

5. The geospatial multiviewer of claim 2, wherein the renderer is configured to provide the output presentation as successive frames having a predetermined frame rate.

6. The geospatial multiviewer of claim 5, wherein the predetermined frame rate comprises a broadcast video frame rate.

7. The geospatial multiviewer of claim 1, further comprising:
- at least one decoder configured to decode received content and provide decoded content; and
- an asynchronous transfer engine configured to receive the representation of the at least one geographical region provided by the geospatial application and the decoded content, the asynchronous transfer engine transferring the representation of the at least one geographical region and the decoded content to graphics memory to facilitate rendering of the output presentation.

8. The geospatial multiviewer of claim 7, further comprising a renderer configured to render the output presentation for each of the plurality of frames based on the transformation generated for each respective frame, the renderer including the graphics memory, the asynchronous transfer engine being configured to transfer the representation of the at least one geographical region and the decoded content directly to corresponding locations in the graphics memory of the renderer.

9. The geospatial multiviewer of claim 7, wherein the decoded content comprises at least one stream of decoded video content.

10. The geospatial multiviewer of claim 7, wherein the representation of the at least one geographical region and the decoded content are provided to the asynchronous transfer engine at different rates.

11. The geospatial multiviewer of claim 7, wherein the graphics pipeline further comprises a compositor programmed to provide rendering instructions and selected content to the renderer, the compositor generating the rendering instructions based on the at least one transformation to control location and relationships of the objects rendered in each frame of the output presentation, the selected content that is provided by the compositor excluding the representation of the at least one geographical region and the decoded content.

12. The geospatial multiviewer of claim 1, wherein a response to the requested content includes a location identifier for at least one of the plurality of data sources determined to be relevant to the search query, the request engine employing the location identifier to retrieve corresponding content from the at least one of the plurality of data sources, wherein the at least one of the plurality of data sources includes the video source.

13. The geospatial multiviewer of claim 1, wherein the received content further comprises geospatial metadata that provides a geospatial reference for the received content, the graphics pipeline employing the geospatial metadata to control a relative placement of an object corresponding to the video stream captured by the camera with respect to the representation of the at least one geographical region.

14. The geospatial multiviewer of claim 1, wherein the search query comprises geospatial descriptors from the geospatial application corresponding to a user-defined frame of reference for at least one geographical region.

15. The geospatial multiviewer of claim 1, wherein the user input is received from at least one of a local user via a user input device and a remote user through a network.

16. The geospatial multiviewer of claim 14, further comprising a streaming engine that is configured to stream an encoded version of the output presentation to at least one remote user over a network.

17. The geospatial multiviewer of claim 1, wherein the video content provided by the video source further comprises another video stream.

18. The geospatial multiviewer of claim 1, wherein the objects in the output presentation further comprising a content window object for the video stream, the graphics pipeline being further configured to position the video object within the content window object in the output presentation and overlay the content window object directly over the portion of the region object that corresponds to the geospatial location represented in the content of the video stream.

19. The geospatial multiviewer of claim 1, wherein the representation of the at least one geographical region corresponds to one of a 2-Dimension (2-D) geographical map representation of the at least one geographical region or a 3-Dimension (3-D) geographical map representation of the at least one geographical region.

20. A geospatial multiviewer comprising:
- a geospatial application that provides geospatial data in response to a user input, the geospatial data corresponding to a representation of at least one geographical region;
- a request engine configured to send a search query for requesting content from a plurality of data sources, wherein the plurality of data sources comprise a plurality of video sources to provide a plurality of video streams, the search query being based at least in part on the geospatial data from the geospatial application;
- an asynchronous transfer engine configured to receive the representation of the at least one geographical region provided by the geospatial application and received content response to the search query, the asynchronous transfer engine routing the representation of the at least one geographical region and the received content to graphics memory to facilitate rendering a given frame of the output presentation; and
- a graphics pipeline configured to dynamically generate at least one transformation for adjusting at least one selected video object comprising a video stream of a subset of the plurality of video streams in the output presentation based on the user input and a priority level of the selected video stream, the given frame of the output presentation being rendered based on at least one corresponding transformation and based on the received content selected in response to the search query and the representation of at least one geographical region stored in the graphics memory, the graphics pipeline further configured to overlay the at least one selected video object directly over a respective portion of the at least one geographical region for the given frame of the output presentation that corresponds to a geographical location represented in content of the video stream.

21. The geospatial multiviewer of claim 20, wherein the graphics pipeline further comprises:

a compositor programmed to provide rendering instructions and selected content to a renderer, the compositor generating the rendering instructions based on the at least one transformation to control location and relationships of the objects rendered in each frame of the output presentation, the renderer comprising the graphics memory, the selected content that is provided by the compositor excluding the representation of the at least one geographical region and the received content that is provided to the graphics memory by the asynchronous transfer engine.

22. The geospatial multiviewer of claim 20, wherein the received content further comprises geospatial metadata that provides a geospatial reference for the received content, the graphics pipeline employing the geospatial metadata to control, for each given frame of the output presentation, an orientation of the video object in the output presentation at which a corresponding content window displaying the video stream captured by the camera is presented relative to the representation of the at least one geographical region.

23. A computer-implemented method for providing geospatial information, comprising:

receiving at least one user input;

providing geospatial data in response to a user input, the geospatial data corresponding to a representation of at least one geographical region that is generated by a geospatial application running on a processor;

sending a search request for content to a plurality of data sources, wherein the plurality of data sources comprise a plurality of video sources to provide a plurality of video streams, the search request including a search query based at least in part on the geospatial data;

receiving content from the plurality of data sources;

generating at least one transformation in response to the user input for controlling a relationship among objects rendered in an output presentation, wherein the objects in the output representation comprising a region object representing the at least one geographical region and selected video objects corresponding to a subset of the plurality of video streams selected in response to the search query, wherein at least one of the selected video objects comprises a respective video stream of the subset of the plurality of video streams; and rendering a frame of the output representation based on at least one transformation, the received content selected in response to the search query and the representation of at least one geographical region, such that the selected video objects directly overlay respective portions of the region object in the frame of the output presentation, wherein a respective portion of the region object over which each of the selected video objects is overlaid corresponds to a geographical location represented in content of a respective video stream of the subset of the plurality of video streams.

24. The method of claim 23, further comprising directly transferring to graphics memory at least one of the received content and the representation of at least one geographical region to facilitate the rendering of each frame of the output presentation.

* * * * *